April 9, 1963 R. L. WRAY, JR 3,085,145
VAPORIZER
Filed March 9, 1960 3 Sheets-Sheet 1
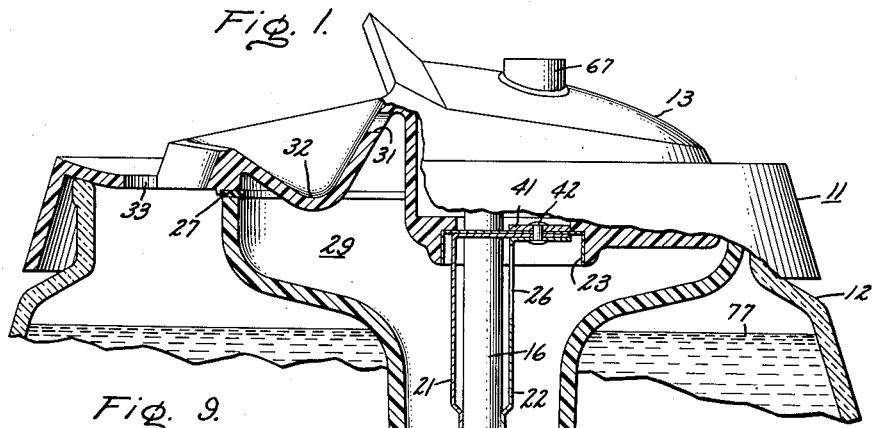
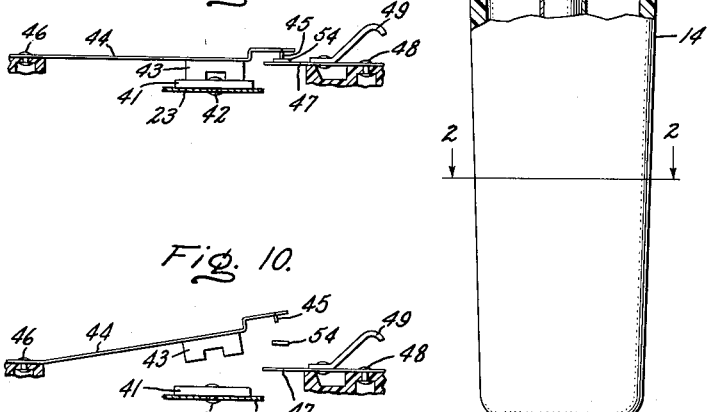
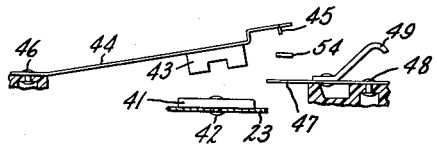
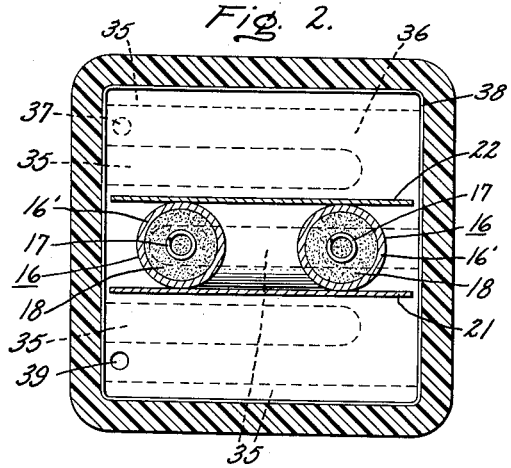
Inventor:
Robert L. Wray, Jr.
by Lawrence R. Kempton
His Attorney.

April 9, 1963 R. L. WRAY, JR 3,085,145
VAPORIZER
Filed March 9, 1960 3 Sheets-Sheet 2
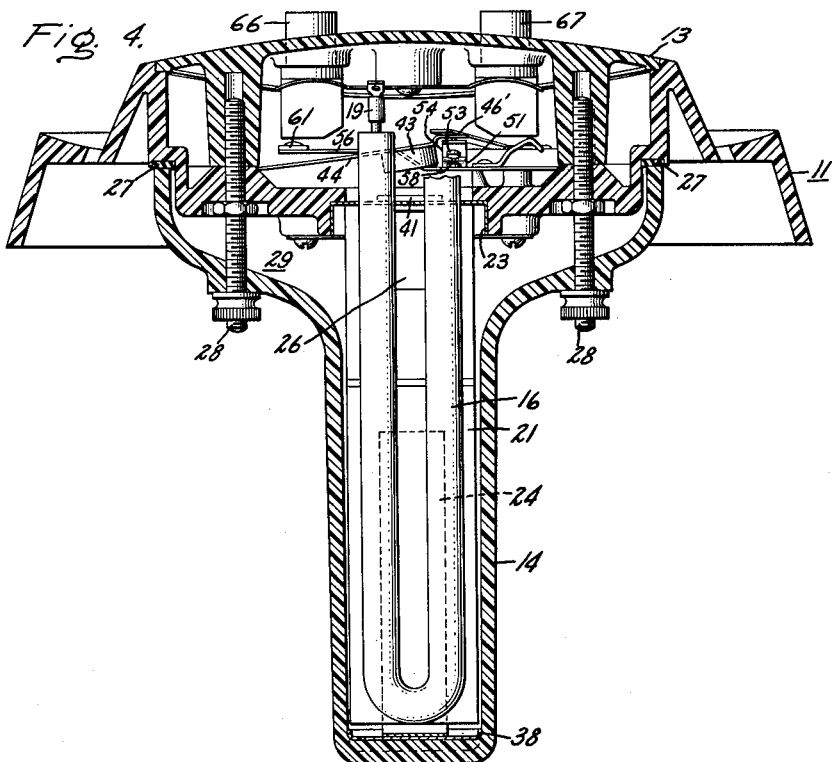
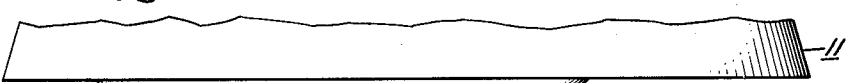
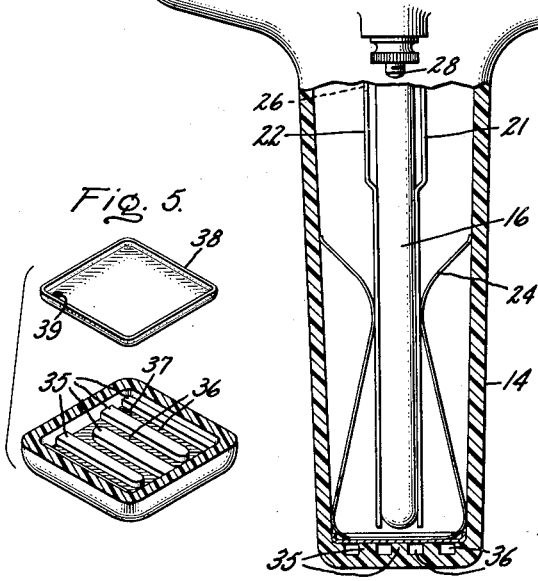
Inventor:
Robert L. Wray, Jr.
by Laurence R. Kempton
His Attorney April 9, 1963 R. L. WRAY, JR 3,085,145
VAPORIZER
Filed March 9, 1960 3 Sheets-Sheet 3

Inventor:
Robert L. Wray, Jr.
by Lawrence R. Kempton
His Attorney.

United States Patent Office 3,085,145
Patented Apr. 9, 1963

3,085,145
VAPORIZER
Robert L. Wray, Jr., Asheboro, N.C., assignor to General Electric Company, a corporation of New York
Filed Mar. 9, 1960, Ser. No. 13,757
8 Claims. (Cl. 219—41)

This invention relates to vaporizers, and particularly to liquid vaporizers for producing steam.

Generally, vaporizers may be classified into two types: the electrolytic type and the heater-element type, the object of both types being to heat a liquid, such as water, to the extent that it will become vaporized so as to produce steam. A medicament cup often is provided, which is heated by the steam and over which the steam passes, thereby to fill the surrounding space with medicated vapor. The vaporizer of the present invention is of the heater-element type.

Vaporizers have had certain drawbacks for which there has been need of improvement. For example, in the electrolytic type of vaporizer, wherein electrodes are immersed in a liquid and electric current is passed through the liquid between the electrodes thereby to heat and vaporize the liquid, there is a shock hazard because the liquid is at an electrical potential with respect to ground and also the performance tends to be erratic due to varying electrical resistance of the liquid through which the heating current is passed. Other drawbacks are the fact that if water is used as the liquid to be vaporized, other material must be added to improve the electrical conductivity. Furthermore, the useful life of electrolytic vaporizers is limited by chemical and electrical corrosion effects. The principal drawback of the heater-element type of vaporizer has been that it takes a considerable time to heat up the liquid to a sufficient temperature for the vaporizing process to occur, and also the heating element may overheat when the liquid becomes exhausted. Another drawback of the prior art vaporizers is the existence of a scalding hazard and electrical shock in the event that the hot liquid should spill from its container or in the event that the container should break.

An object of the present invention is to provide a vaporizer which obviates the above-mentioned drawbacks of the prior art vaporizers.

Another object is to provide a vaporizer which produces vapor quickly and which operates satisfactorily with different amounts of liquid contained therein.

A further object is to provide a vaporizer which will function reliably and for a long time before it becomes necessary to clean the heater element.

Still another object is to provide a vaporizer construction wherein a relatively small amount of the total volume of liquid is heated to produce the required amount of vapor.

Other objects will be apparent from the disclosure and claims, and from the drawing.

In a preferred embodiment of the invention for carrying out the objects thereof, a heater element is provided in an enclosure which is adapted to be inserted in a container of liquid to be vaporized. Within the heater enclosure, one or more baffles are resiliently positioned against the heater element so that the heating and vaporizing is confined to a relatively small volume of liquid in the immediate vicinity of the heater element. A heated passage-way is provided through the wall of the heater enclosure so that water or other liquid from the container is pre-heated as it passes to the interior of the enclosure. One or more openings are provided at the upper end of the baffles so as to direct the steam and accompanying water vapor into a plenum chamber in such a manner that any water droplets accompanying the steam will return to the liquid supply in the container. A heat-sensitive switch is arranged to receive heat from the heater and the baffles and to turn off the heating power when the temperature exceeds a predetermined value due to depletion of liquid in the container or in the event of hard water deposits upon the heater element, the latter informing the user that cleaning is needed.

In the accompanying drawing,

FIG. 1 is a side view, partly in sectional form, of a preferred embodiment of the invention;

FIG. 2 is a cross-sectional view taken on the line 2—2 of FIG. 1;

FIG. 3 is a side view of the preferred embodiment taken from the same side as FIG. 1, and is sectionalized to show additional details of construction;

FIG. 4 is a side sectional view of the invention, taken at an angle of 90° with respect to FIGS. 1 and 3;

FIG. 5 is a perspective view of a detail of the invention;

FIGS. 9 and 10 show operative details of the switch mechanism.

Figure 6:
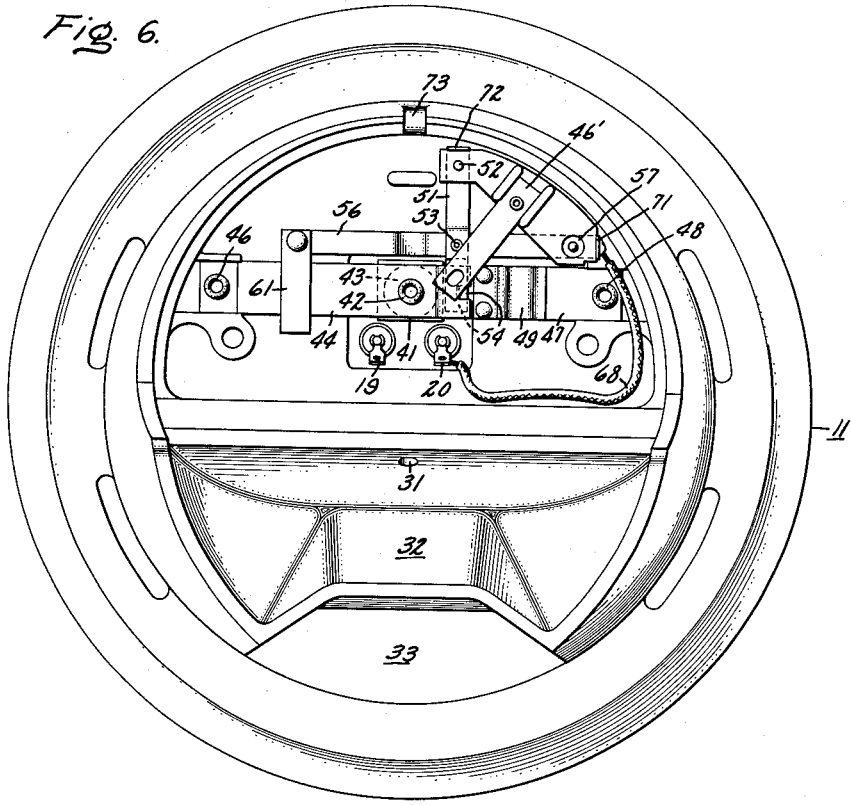
FIG. 6 is a top view of the invention with the cover removed.

As shown in the drawing, the preferred embodiment of the invention comprises a housing 11, adapted to fit over the top of an open-mouth liquid container 12. A cover 13 is positioned over the housing 11, and a heater enclosure 14 is attached to the under side of the housing 11. The housing 11, cover 13, and heater enclosure 14 preferably are made of molded plastic. The container 12 may be made of glass or plastic. A heater element 16, of elongated U-shape, extends downwardly from the housing 11 and into the heater enclosure 14. The heater element 16 may comprise an outer sheath 16', preferably of copper or other material having high thermal conductivity and corrosion resistance, containing a heater wire 17 of Nichrome or other resistance material and supported in electrical isolation with respect to the sheath 16' by means of an electrical insulation 18 which may be, for example, magnesium oxide. The ends of the heater wire 17 are electrically connected, respectively, to terminals 19, 20 (FIG. 6) of the heater element. A pair of elongated sheet-like baffles 21, 22, preferably made of copper, are respectively positioned against the two sides of the heater element 16 and, as shown, are attached to the under side of a heat-conductive support plate 23 which is carried by the housing 11. A spring clip 24, generally having a U-shape, is placed over and around the two baffles 21, 22 so as to resiliently hold the baffles 21, 22 against the two sides of the U-shaped heater element 16. An opening 26 is provided in the baffle 22 near the upper end thereof. It is preferable, though not essential, that the baffles 21, 22 be shaped so that the upper portions thereof are spaced away from the heater element 16, as shown.

The upper portion of the heater enclosure 14 is shaped to provide an enlarged circular cross-section that is sealed against the underside of the housing 11 by means of a gasket 27, and is held in place by means of screws 28. The upper portion of the heater enclosure 14 provides a plenum chamber 29. As will be described in detail hereafter, steam and liquid droplets that are generated at the heater element 16 passes through the opening 26 into the plenum chamber 29. The steam passes out through a steam exit hole 31, and the liquid falls back into the container 14. A medicament cup 32 is formed in the housing 11 for the purpose of holding medicine over which steam passes, thereby producing medicated vapor. The cup 32 is heated by the steam beneath it. A fill opening 33 is provided in the housing 11 through which liquid such as water may be poured into the container 12 without removing the vaporizer proper from the container.

As is best shown in FIGS. 2, 3, and 5, the inside of the bottom portion of the heater enclosure 14 is provided with parallel ribs 35 to provide an elongated path, or maze 36, there being a water inlet opening 37 through the bottom of the heater enclosure 14 for the purpose of permitting water from the container 12 to enter the maze 36. A metal plate 38 is positioned over the maze 36 and contains an opening 39 at the remote end of the maze 36 from the inlet opening 37, whereby water from the container 12 must pass through the elongated path of the maze 36 before entering the heater enclosure 14. If desired, the plate 38 may be fitted somewhat loosely so that water from the maze 36 passes around the edges of the plate 38 in order to enter the enclosure 14.

The electrical switching mechanism, contained in the housing 11 and covered over by the cover 13, will now be described. A heat-sensitive magnetic armature 41 is positioned against the upper side of the support plate 23. As shown, a single rivet 42 functions to hold the baffles 21, 22 and the armature 41 against the support plate 23. A small permanent magnet 43 is carried by a resilient blade 44 which is attached at an end thereof to the housing 11, as shown at 46. The arrangement is such that the resilient blade 44 will hold the magnet 43 away from the armature 41; however, the blade 44 is sufficiently resilient that it will permit the magnet 43 to be held against the armature 41, as shown in FIG. 9. The free end of the blade 44 has a downwardly bent portion 45. A semi-rigid member 46' provides a stop for the blade 44 when in its "up" position. A release blade 47 is attached at an end thereof to the housing 11, as indicated at 48. An actuating arm 49 is attached to the release blade 47 as shown.

An upper contact blade 51, made of resilient metal, is attached at an end thereof to the housing 11 as indicated at 52, and is provided with a contact 53 at the underside thereof and furthermore is provided with an extension arm 54 preferably made from insulative material such as laminated fiber, and which extends between the resilient blade 44 and the release blade 47. A lower contact blade 56, made of resilient metal, is attached to the housing 11 as indicated at 57, and carries a contact 58 on the upper side thereof in alignment with the contact 53. A transverse lever arm 61, preferably made from an insulative material such as laminated fiber, is attached to the free end of the lower contact blade 56 and extends over the resilient blade 44. All of the resilient blades 44, 47, 51 and 56 may be made of Phosphor bronze material.

The cover 13 contains an "On" pushbutton 66 located above the transverse arm 61 so that when this button is manually depressed, the arm 61 is forced downwardly against the blade 44, thereby bringing the permanent magnet 43 sufficiently close to the armature 41 so as to be drawn against the armature. The cover 13 also contains an "Off" button 67 arranged above the actuating arm 49, so that when this button is manually depressed the free end of the arm 49 will be forced downwardly, thereby raising the free end of the release blade 47 so as to force the extension arm 54 and the resilient blade 44 upwardly thereby to release the magnet 43 from the armature 41.

The heater wire 17 and the contacts 53, 58 are connected electrically in series. This is accomplished, for example, by a wire 68 connected between the heater terminal 20 and the anchored end 71 of the lower contact blade 56. The two wires of a line cord set (not shown) are connected, respectively, to the heater terminal 19 and to the anchored end 72 of the upper contact blade 51. A groove 73 (FIG. 6) is provided in the housing 11 through which the line cord may pass; the remote end of the line cord contains a plug adapted to be plugged into a household electrical outlet.

Figure 7:
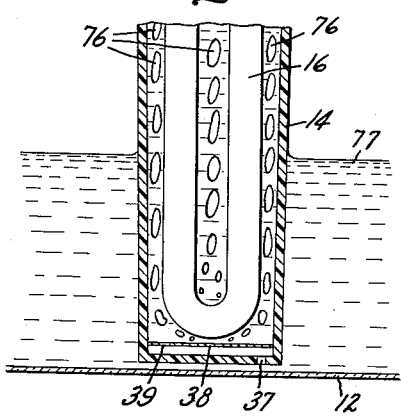
FIGS. 7 and 8 illustrates the functioning of the invention.
Figure 8:
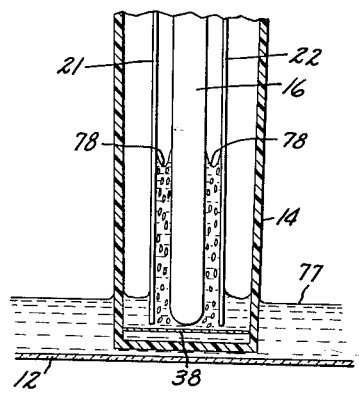

The vaporizer of this invention functions as follows. The liquid 77 to be vaporized, for example water, is placed in the container 12. The container 12 may be filled with liquid to the level of the opening 26 in the baffle 22. The "On" button is depressed, thereby bringing the permanent magnet 43 into holding engagement with the armature 41 and simultaneously forcing the extension arm 54, and hence the upper contact blade 51, downwardly so that the upper contact 53 is lowered to its operating position. While the "On" button is in its downwardly depressed condition, the transverse arm 61 causes the lower contact blade 56 to be depressed slightly below its normal operative position, whereby the lower contact 58 is slightly below and out of electrical contact with the upper contact 53. Thus, there is no electrical contact, and the vaporizer device is inoperative, while the "On" button is depressed. This is a safety feature, to prevent the vaporizer from heating indefinitely in the event the "On" button is jammed or held in the downward position. When the "On" button is released, the transverse arm 61 and the lower contact blade 56 move upwardly to the extent necessary for the lower contact 58 to make electrical contact with the upper contact 53. Assuming that a suitable source of power is connected to the terminals 19 and 72, the heater element 16 will now become warm. In a short while, the water surrounding the heater element 16 and within the confines of the enclosure 14 will begin to boil. Bubbles of vapor form over the surface of the heater, and detach themselves and rise upwardly carrying sufficient water to cool the heater, as indicated by the numerals 76 in FIG. 7, by the principle of percolation. FIG. 7 is a front view of the arrangement, whereas FIG. 8 is a side view. When the level of the water 77 in the container 12 is at a relatively low level, as shown in FIG. 8, capillary action causes the water to rise to a higher level in the relatively narrow spaces between the heater element 16 and the baffles 21, 22 as indicated by the numeral 78 in FIG. 8, so that a sufficient quantity of water is heated, percolated and vaporized by the heating element 16. In FIG. 8 the spacings shown between the baffles 21, 22 and the heater element 16 are greatly exaggerated to better illustrate the operating principles.

Heated vapor and water droplets rise between the baffles 21, 22 and pass through the opening 26 into the plenum chamber 29, thereby warming the medicament cup 32. The vapor emerges through the steam exit hole 31, and the hot water droplets return to the lower portion of the heater enclosure 14.

The water from the container 12, enters the heater enclosure 14 through the opening 37 in the bottom thereof, then follows through the elongated and tortuous passageway 36, and passes through the opening 39 in the metal plate 38. Alternatively, if desired, the water may pass around the edges of the plate 38. As the incoming water passes through the path 36 its flow is restricted and it is in contact with the hot metal plate 38 which is heated due to its contact with the hot water within the heater enclosure 14, whereby the incoming water becomes preheated thereby increasing the efficiency and operational stability of the vaporizer mechanism. An additional function of the plate 38 is to distribute heat from the bottom part of the heater 16, to protect the bottom of the enclosure 14 from a concentration of heat. The elongated passageway 36 provides a desired resistance to the flow of liquid, and is advantageous over the use of a small hole for providing this flow control because the said elongated passage-way may have a larger cross-section than an equivalent hole and therefore is less likely to become clogged.

Over a period of time, the heat and water will cause a scale to build up on the heater and baffles. As this scale builds up, the spring clip 24 permits the baffles 21, 22 to yield to the extent necessary, thereby preventing clogging and prolonging the useful life of the mechanism before the scale must be cleaned off.

During the normal operation of the vaporizer, as described above, the thermo-sensitive armature 41 holds the magnet 43 thereagainst, whereby the contacts 53 and 58 remain closed. Then the water or other liquid 77 in the container 12 is nearly exhausted, and is at a level lower than that shown in FIG. 8, the heating element 16 becomes hotter than is required for normal operation, due to the lack of cooling effect of water against the sides of the heating element 16. This higher temperature of the heating element, and of the baffles 21, 22 causes the support plate 23, and hence the heat-sensitive armature 41, to become heated to the point where it loses attraction for the permanent magnet 43, whereupon the magnet releases from the armature 41 and the resilient blade 44 rises to the "Off" position as shown in FIG. 10, whereupon the contacts 53 and 58 break apart thereby shutting off the power to the heating element, and the vaporizer ceases to function until it again is made operative. The support plate 23 may be swaged or otherwise attached to the heater element 16 to facilitate heat conduction from the heater element 16 to the armature 41. A suitable material for the heat-sensitive magnetic armature 41 is a nickel-iron alloy composed of 31% to 36% nickel and 0.5% to 1.0% carbon, the remainder being iron. The support plate 23 not only functions to carry heat to the heat-sensitive armature 41, but also functions as part of the separation barrier between the wet and dry portions of the vaporizer and it prevents the heater 16 from being in undesirable direct contact with the plastic material of the housing 11. The plate 23 dissipates heat from the heater 16 over a relatively larger surface area of the housing 11, thereby preventing overheating thereof.

From the foregoing, it will readily be seen that the vaporizer of this invention produces vapor quickly after being turned on, because only a relatively small amount of water need be heated in the confined space within the enclosure 14. The vaporizer will function reliably in a fail-safe manner, and for a long time before cleaning is required because of the resilient positioning of the baffles 21, 22 against the heating element 16. The vaporizer will function with varying amounts of water contained therein, all the way from the "Full" level down to a relatively low level due to the capillary and perking or percolation action which draws water upwardly between the baffles 21, 22 and the heating element 16. The vaporizer efficiency is improved by the heated maze 36 through which the water enters the heater enclosure 14. The vapor which passes out through the exit hole 31 is a relatively "Dry" steam since water droplets are effectively separated therefrom in the plenum chamber 29. The liquid is conveniently replenished through the fill opening 33 without the need for removing the housing 11 from the container 12.

The scalding risk is minimized, because, if the liquid container 12 should break or be tipped over, the liquid 77 therein is not scalding hot. If the housing 11 should be tipped over so that water contained in the heater enclosure 14 can trickle out through exit hole 31, the scalding risk is very slight because only a relatively small amount of water in the heater enclosure 14 is at steaming temperature.

While a preferred embodiment of the invention has been shown and described, various other embodiments and modifications thereof will be apparent to those skilled in the art, and will be encompassed within the scope of the present invention as defined in the following claims.

What I claim is:

1. A vaporizer comprising a housing providing a heater enclosure, said housing being provided with a steam exit opening at the upper portion thereof, an elongated heater element suspended vertically within said heater enclosure, a pair of elongated baffle plates resiliently held against said heater element on opposite sides thereof, an opening in one of said baffle plates near the upper end thereof and facing in a direction generally away from said steam exit opening, a heat-sensitive switch mechanism for connecting power to said heater element and arranged to receive heat from said baffle plates, a liquid entrance passage-way through the wall of said heater enclosure, and means for causing said passage-way to be heated by said heater element.

2. A liquid vaporizer comprising a vaporizing enclosure, an elongated heating element arranged in a vertical position within said enclosure and adapted to be immersed in the liquid, at least one elongated baffle plate within said vaporizing enclosure and arranged vertically and positioned against said heating element, a control chamber including wall means separating said vaporizing enclosure from said control chamber, and a magnetically operated switch in said control chamber having a heat sensitive armature connected to and receiving heat from said baffle plate.

3. A vaporizer comprising a housing, an elongated electrical heater element depending downwardly from said housing, a support plate carried by said housing and having a first surface exposed to the interior of said housing and having a second surface exposed to the exterior of said housing, at least one elongated baffle plate attached to said first surface of said support plate and extending alongside said heater element, and switch means for controlling the electrical current flowing through said heater element and including an armature of heat-sensitive magnetic material attached to the second surface of said support plate for automatically opening said switch means to interrupt the flow of current to the heater element whenever the temperature of said armature reaches a predetermined level.

4. A vaporizer comprising a liquid container, a heater enclosure positioned within said container, an electrical heater positioned within and spaced from the surrounding walls of said heater enclosure, means for permitting liquid flow from said container into said heater enclosure, and at least one baffle element held resiliently against said heater for confining the vaporization of liquid to the immediate vicinity of said heater.

5. A liquid vaporizer comprising a liquid container, a heater enclosure positioned within said container, an elongated heater element having opposed lateral surfaces positioned within said heater enclosure, a passage permitting liquid to flow from said container into said heater enclosure, a pair of elongated baffle plates movably positioned against respective lateral surfaces of said heater element for limiting the vaporization of liquid to the area defined by the baffle plates, and spring clip means positioned against said baffle plates to hold said baffle plates resiliently against said heater element.

6. A liquid vaporizer comprising an open-mouthed liquid container, a heater enclosure suspended within the container and supported by the mouth of the container, an elongated U-shaped heater element having opposed lateral surfaces vertically positioned within said enclosure, means for permitting liquid to flow from said container into said enclosure, a pair of elongated baffle plates held resiliently against respective lateral surfaces of said heater element to confine the vaporization of liquid to the area between said baffle plates, and an exit opening through at least one of said baffle plates near the upper end thereof for the passage of vapor from the space between said baffle plates.

7. A liquid vaporizer comprising a liquid container, a heated enclosure positioned within said container, an electrical heater element positioned within said heater enclosure, a labyrinth passageway through a wall of said heater enclosure to permit liquid to flow into said enclosure from the surrounding container, a plate of heat conductive material defining an enclosing wall of said passageway, said plate being closely positioned to said heater element between said passageway and the element, thereby to heat liquid in said passageway flowing into said heater enclosure, and a steam exit hole formed within a wall of said heater enclosure to permit the escape of vapor formed within the enclosure.

8. A liquid vaporizer comprising a liquid container, a tubular shaped heater enclosure and a heater element contained therein, said heater enclosure having its lower end substantially closed, the inside surface of said enclosure end being provided with rib means arranged to form a liquid passageway, said heater enclosure end having an opening whereby liquid may enter an end of said passageway from said liquid container, and a heat conductive plate positioned over said rib means defining said passageway and containing an opening at the other end of said passageway through which liquid may enter said heater enclosure, said heat conductive plate being positioned between said passageway and said heater element whereby liquid in said passageway is heated by heat distributed by said plate.

References Cited in the file of this patent

UNITED STATES PATENTS

| Number | Name | Date |
|---|---|---|
| Re. 24,196 | Barkin | Aug. 21, 1956 |
| 941,215 | Wade | Nov. 23, 1909 |
| 1,308,023 | Abtmeyer | July 1, 1919 |
| 1,470,834 | Hasselbach | Oct. 16, 1923 |
| 1,749,969 | Brodin | Mar. 11, 1930 |
| 1,946,247 | Wales | Feb. 6, 1934 |
| 2,023,324 | Johnson et al. | Dec. 3, 1935 |
| 2,076,709 | Deutsch | Apr. 13, 1937 |
| 2,296,969 | Wittmann | Sept. 29, 1942 |
| 2,763,765 | Kuzmin et al. | Nov. 23, 1948 |
| 2,541,162 | Hermann | Feb. 13, 1951 |
| 2,561,932 | Landgraf | July 24, 1951 |
| 2,663,785 | Graham | Dec. 22, 1953 |
| 2,763,765 | Duberstein et al. | Sept. 18, 1956 |
| 2,847,547 | Gordon | Aug. 12, 1958 |
| 2,847,548 | Gordon et al. | Aug. 12, 1958 |

FOREIGN PATENTS

| 372,675 | Germany | Mar. 31, 1923 |